US008930557B2

(12) United States Patent
Pope et al.

(10) Patent No.: US 8,930,557 B2
(45) Date of Patent: Jan. 6, 2015

(54) DATA TRANSMISSION WITH CONSTANT DATA RATE

(75) Inventors: Steve L. Pope, Cambridge (GB); Derek Roberts, Cambridge (GB); David J. Riddoch, Cambridge (GB); David Clarke, Harston (GB)

(73) Assignee: Solarflare Communications, Inc., Irvine, CA (US)

( * ) Notice: Subject to any disclaimer, the term of this patent is extended or adjusted under 35 U.S.C. 154(b) by 1778 days.

(21) Appl. No.: 10/548,121

(22) PCT Filed: Mar. 3, 2004

(86) PCT No.: PCT/GB2004/000879
§ 371 (c)(1),
(2), (4) Date: May 24, 2006

(87) PCT Pub. No.: WO2004/080005
PCT Pub. Date: Sep. 16, 2004

(65) Prior Publication Data
US 2007/0022206 A1    Jan. 25, 2007

(30) Foreign Application Priority Data

Mar. 3, 2003  (GB) .................................. 0304808.9

(51) Int. Cl.
*G06F 15/16* (2006.01)
*H04L 12/801* (2013.01)

(52) U.S. Cl.
CPC ...................................... *H04L 47/10* (2013.01)
USPC ........................... 709/230; 709/232; 709/233

(58) Field of Classification Search
USPC ......................................... 709/230, 232, 233
See application file for complete search history.

(56) References Cited

U.S. PATENT DOCUMENTS

| 5,307,351 | A | * | 4/1994 | Webster | ........................ 370/470 |
| 5,535,216 | A | * | 7/1996 | Goldman et al. | ............. 370/503 |
| 5,703,878 | A | | 12/1997 | Duault | |
| 5,999,541 | A | | 12/1999 | Hinchey et al. | |
| 6,038,231 | A | | 3/2000 | Dolby et al. | |
| 6,330,286 | B1 | * | 12/2001 | Lyons et al. | ............. 375/240.28 |

FOREIGN PATENT DOCUMENTS

EP    1 209 864 A2    5/2002

OTHER PUBLICATIONS

Riddoch, David et al.; "Distributed Computing With the CLAM Network"; Laboratory for Communications Engineering, Cambridge, England; SIGCOMM 2002, 13 pages.

(Continued)

*Primary Examiner* — Noel Beharry
*Assistant Examiner* — Farhad Ali
(74) *Attorney, Agent, or Firm* — Haynes Beffel & Wolfeld LLP

(57) ABSTRACT

A method for forming data received from a data source into frames for transmission over a data link according to a protocol in which data is carried as data frames and in which once transmission of the data frame begun the entirety of the data frame must be transmitted at no less than a pre-set data rate, the method comprising: including in a frame traffic data formed from data received for transmission from the data source, and if insufficient data received for transmission from the data source is available to transmit the frame at the pre-set data rate, including in the frame padding data, the padding data being of a predetermined format distinguishable from the traffic data.

24 Claims, 2 Drawing Sheets

(56) References Cited

OTHER PUBLICATIONS

Mansley, Kieran; "Engineering a User-Level TCP for the CLAN Network"; Laboratory for Communication Engineering, University of Cambridge, Cambridge, England; AGM SIGCOMM Aug. 2003 Workshops, 228-236.
Pratt, Ian et al.; "Arsenic: A User-Accessible Gigabit Ethernet Interface"; Computer Laboratory, University of Cambridge, England; UK Engineering and Physical Sciences Research Councel (EPSRC), Apr. 2001, 11 pages.
Bilic Hrvoye, et al.; article in Proceedings of the 9th Symposium on High Performance Interconnects, "Deferred Segmentation for Wire-Speed Transmission of Large TCP Frames over Standard GbE Networks," Aug. 22, 2001, 5pp.
Bilic Hrvoye, et al.; presentation slides from 9th Symposium on High Performance Interconnects, "Deferred Segmentation for Wire-Speed Transmission of Large TCP Frames over Standard GbE Networks," Aug. 22, 2001, 9pp.
Bruce Lowekamp, et al.; ACM Computer Communication Review, vol. 31, No. 4, 2001, Oct. 2001.
Piyush Shivam, et al.; Proceedings of the 2001 ACM/IEEE conference on Supercomputing, pp. 57, Denver, Nov. 10, 2001.
Robert Ross, et al.; Proceedings of the 2001 ACM/IEEE conference on Supercomputing, pp. 11, Denver, Nov. 10, 2001.
E. Blanton and M. Allman; ACM Computer Communication Review, vol. 32, No. 1, 2002, Jan. 2002.
Murali Rangarajan, et al.; Technical Report DCR-TR-481, Computer Science Department, Rutgers University, 2002. , Mar. 2002.
Jon Crowcroft, Derek McAuley; ACM Computer Communication Review, vol. 32, No. 5, 2002, Nov. 2002.
Charles Kalmanek; ACM Computer Communication Review, vol. 32, No. 5, pp. 13-19, 2002, Nov. 2002.
Jonathan Smith; ACM Computer Communication Review, vol. 32, No. 5, pp. 29-37, 2002, Nov. 2002.
Nr Adiga, et al.; Proceedings of the 2002 ACM/IEEE conference on Supercomputing, pp. 1-22, Baltimore, Nov. 16, 2002.
Steven J. Sistare, Christopher J. Jackson; Proceedings of the 2002 ACM/IEEE conference on Supercomputing, p. 1-15, Baltimore, Nov. 16, 2002.
R. Bush, D. Meyer; IETF Network Working Group, Request for Comments: 3439, Dec. 2002.
Pasi Sarolahti, et al.; ACM Computer Communication Review, vol. 33, No. 2, 2003, Apr. 2003.
Tom Kelly; ACM Computer Communication Review, vol. 33, No. 2, pp. 83-91, 2003, Apr. 2003.
Jeffrey C. Mogul; Proceedings of HotOS IX: The 9th Workshop on Hot Topics in Operating Systems, pp. 25-30, May 18, 2003.
Derek McAuley, Rolf Neugebauer; Proceedings of the ACM SIGCOMM 2003 Workshops, Aug. 2003.
Justin Hurwitz, Wu-chun Feng; Proceedings of the 11th Symposium on High Performance Interconnects, Aug. 20, 2003.
Vinay Aggarwal, et al.; ACM Computer Communication Review, vol. 33, No. 5, 2003, Oct. 2003.
Wu-chun Feng, et al.; Proceedings of the 2003 ACM/IEEE conference on Supercomputing, Phoenix, Arizona, Nov. 15, 2003.
Jiuxing Liu, et al.; Proceedings of the 2003 ACM/IEEE conference on Supercomputing, Phoenix, Arizona, Nov. 15, 2003.
Srihari Makineni and Ravi Iyer; Proceedings of the 10th International Symposium on High Performance Computer Architecture, pp. 152, Feb. 14, 2004.
Cheng Jin, et al.; Proceedings of IEEE Infocom 2004, pp. 1246-1259, Mar. 7, 2004.
Andy Currid; ACM Queue, vol. 2, No. 3, 2004, May 1, 2004.
Greg Regnier, et al.; Computer, IEEE Computer Society, vol. 37, No. 11, pp. 48-58, 2004, Nov. 2004.
Gregory L. Chesson; United States District Court, Northern District California, San Francisco Division, Feb. 4, 2005.
Edward D. Lazowska, David A. Patterson; ACM Computer Communication Review, vol. 35, No. 2, 2005, Jul. 2005.
W. Feng, et al.; Proceedings of the 13th Symposium on High Performance Interconnects, Aug. 17, 2005.
B. Leslie, et al.; J. Comput. Sci. & Technol., vol. 20, Sep. 2005.
P. Balaji, et al.; Proceedings of the IEEE International Conference on Cluster Computing, 2005, Sep. 2005.
Humaira Kamal, et al.; Proceedings of the 2005 ACM/IEEE conference on Supercomputing, Seattle, p. 30, Washington, Nov. 12, 2005.
Sumitha Bhandarkar, et al.; ACM Computer Communication Review, vol. 36, No. 1, pp. 41-50, 2006, Jan. 2006.
H. K. Jerry Chu; Proceedings of the USENIX Annual Technical Conference 1996, Jan. 1996.
Ken Calvert; ACM Computer Communication Review, vol. 36, No. 2, pp. 27-30, 2006, Apr. 2006.
Jon Crowcroft; ACM Computer Communication Review, vol. 36, No. 2, pp. 51-52, 2006, Apr. 2006.
Greg Minshall, et al.; ACM Computer Communication Review, vol. 36, No. 3, pp. 79-92, 2006, Jul. 2006.
David Wetherall; ACM Computer Communication Review, vol. 36, No. 3, pp. 77-78, 2006, Jul. 2006.
Patrick Geoffray; HPCWire article: http://www.hpcwire.com/features/17886984.html, Aug. 18, 2006.
Geoffray P., "Protocol off-loading vs on-loading in high-performance networks," 14th Symposium on High Performance Interconnects, Aug. 23, 2006, 5pp.
Jose Carlos Sancho, et al.; Proceedings of the 2006 ACM/IEEE conference on Supercomputing, Tampa, Florida, Nov. 11, 2006.
Sayantan Sur, et al.; Proceedings of the 2006 ACM/IEEE conference on Supercomputing, Tampa, Florida, Nov. 11, 2006.
Steven Pope, David Riddoch; ACM Computer Communication Review, vol. 37, No. 2, pp. 8-92, 2007, Mar. 19, 2007.
Kieran Mansley, et al.; Euro-Par Conference 2007, pp. 224-233, Rennes, France, Aug. 28, 2007.
M. Kaiserswerth; IEEE/ACM Transactions in Networking vol. 1, Issue 6, pp. 650-663, 1993, Dec. 1993.
Danny Cohen, et al.; ACM Computer Communication Review, vol. 23, No. 4, p. 32-44, 1993, Jul. 1993.
J. Evans and T. Buller; IEEE TCGN Gigabit Networking Workshop, 2001, Apr. 22, 2001.
M.V. Wilkes and R.M. Needham; ACM SIGOPS Operating Systems Review, vol. 14, Issue 1, pp. 21-29, 1980, Jan. 1980.
Dickman, L., "Protocol OffLoading vs OnLoading in High Performance Networks," 14th Symposium on High Performance Interconnects, Aug. 23, 2006, 8pp.
Mogul J., "TCP offload is a dumb idea whose time has come," USENIX Assoc., Proceedings of HotOS IX: The 9th Workshop on Hot Topics in Operating Systems, May 2003, pp. 24-30.
Petrini F., "Protocol Off-loading vs On-loading in High-Performance Networks," 14th Symposium on High Performance Interconnects, Aug. 23, 2006, 4pp.
Gordon E. Moore; Electronics, vol. 38, No. 8, pp. 114-117, 1965, Apr. 19, 1965.
Jack B. Dennis and Earl C. Van Horn; Communications of the ACM, vol. 9, No. 3, pp. 143-155, 1966, Mar. 1966.
Marvin Zelkowitz; Communications of the ACM, vol. 14, No. 6, p. 417-418, 1971, Jun. 1971.
J. Carver Hill; Communications of the ACM, vol. 16, No. 6, p. 350-351, 1973, Jun. 1973.
F.F. Kuo; ACM Computer Communication Review, vol. 4 No. 1, 1974, Jan. 1974.
Vinton Cerf, Robert Kahn; IEEE Transactions on Communications, vol. COM-22, No. 5, pp. 637-648, 1974, May. 1974.
V. Cerf, et al.; ACM Computer Communication Review, vol. 6 No. 1, p. 1-18, 1976, Jan. 1976.
Robert M. Metcalfe and David R. Boggs; Communications of the ACM, vol. 19, Issue 7, pp. 395-404, 1976, Jul. 1976.
P. Kermani and L. Kleinrock; Computer Networks, vol. 3, No. 4, pp. 267-286, 1979, Sep. 1979.
John M. McQuillan, et al.; Proceedings of the 6th Data Communications Symposium, p. 63, 1979, Nov. 1979.
Andrew D. Birrell, et al.; Communications of the ACM, vol. 25, Issue 4, pp. 260-274, 1982, Apr. 1982.
Ian M. Leslie, et al.; ACM Computer Communication Review, vol. 14, No. 2, pp. 2-9, 1984, Jun. 1984.

(56) References Cited

OTHER PUBLICATIONS

John Nagle; ACM Computer Communication Review, vol. 14, No. 4, p. 11-17, 1984, Oct. 1984.
Robert M. Brandriff, et al.; ACM Computer Communication Review, vol. 15, No. 4, 1985, Sep. 1985.
C. Kline; ACM Computer Communication Review, vol. 17, No. 5, 1987, Aug. 1987.
Christopher A. Kent, Jeffrey C. Mogul; ACM Computer Communication Review, vol. 17, No. 5, pp. 390-401, 1987, Oct. 1987.
Gary S. Delp, et al.; ACM Computer Communication Review, vol. 18, No. 4, p. 165-174, 1988, Aug. 1988.
David R. Boggs, et al.; ACM Computer Communication Review, vol. 18, No. 4, p. 222-234, 1988, Aug. 1988.
H. Kanakia and D. Cheriton; ACM Computer Communication Review, vol. 18, No. 4, p. 175-187, 1988, Aug. 1988.
V. Jacobson; ACM Computer Communication Review, vol. 18, No. 4, p. 314-329, 1988, Aug. 1988.
David D. Clark; ACM Computer Communication Review, vol. 18, No. 4, pp. 106-114, 1988, Aug. 1988.
Paul V. Mockapetris, Kevin J. Dunlap; ACM Computer Communication Review, vol. 18, No. 4, pp. 123-133, 1988, Aug. 1988.
Margaret L. Simmons and Harvey J. Wasserman; Proceedings of the 1988 ACM/IEEE conference on Supercomputing, p. 288-295, Orlando, Florida, Nov. 12, 1988.
David A. Borman; ACM Computer Communication Review, vol. 19, No. 2, p. 11-15, 1989, Apr. 1989.
R. Braden, et al.; ACM Computer Communication Review, vol. 19, No. 2, p. 86-94, 1989, Apr. 1989.
David D. Clark, et al.; IEEE Communications Magazine, vol. 27, No. 6, pp. 23-29, 1989, Jun. 1989.
David R. Cheriton; ACM Computer Communication Review, vol. 19, No. 4, p. 158-169, 1989, Sep. 1989.
Derek Robert McAuley; PhD Thesis, University of Cambridge, 1989, Sep. 1989.
Craig Partridge; ACM Computer Communication Review, vol. 20, No. 1, p. 44-53, 1990, Jan. 1990.
D. D. Clark and D. L. Tennenhouse; ACM Computer Communication Review, vol. 20, No. 4, pp. 200-208, 1990, Sep. 1990.
Eric C. Cooper, et al.; ACM Computer Communication Review, vol. 20, No. 4, p. 135-144, 1990, Sep. 1990.
Bruce S. Davie; ACM Computer Communication Review, vol. 21, No. 4, 1991, Sep. 1991.
C. Brendan S. Traw, et al.; ACM Computer Communication Review, vol. 21, No. 4, p. 317-325, 1991, Sep. 1991.
Ian Leslie and Derek R. McAuley; ACM Computer Communication Review, vol. 21, No. 4, p. 327, 1991, Sep. 1991.
Mark Hayter, Derek McAuley; ACM Operating Systems Review, vol. 25, Issue 4, p. 14-21, 1991, Oct. 1991.
Gregory G. Finn; ACM Computer Communication Review, vol. 21, No. 5, p. 18-29, 1991, Oct. 1991.
Greg Chesson; Proceedings of the Third International Conference on High Speed Networking, 1991, Nov. 1991.
Michael J. Dixon; University of Cambridge Computer Laboratory Technical Report No. 245, Jan. 1992.
Danny Cohen, Gregory Finn, Robert Felderman, Annette DeSchon; Made available by authors, Jan. 10, 1992.
Gene Tsudik; ACM Computer Communication Review, vol. 22, No. 5, pp. 29-38, 1992, Oct. 1992.
Peter Steenkiste; ACM Computer Communication Review, vol. 22, No. 4, 1992, Oct. 1992.
Paul E. McKenney and Ken F. Dove; ACM Computer Communication Review, vol. 22, No. 4, 1992, Oct. 1992.
Erich Ruetsche and Matthias Kaiserswerth; Proceedings of the IFIP TC6/WG6.4 Fourth International Conference on High Performance Networking IV, Dec. 14, 1992.
C. Traw and J. Smith; IEEE Journal on Selected Areas in Communications, pp. 240-253, 1993, Feb. 1993.
E. Ruetsche; ACM Computer Communication Review, vol. 23, No. 3, 1993, Jul. 1993.
Jonathan M. Smith and C. Brendan S. Traw; IEEE Network, vol. 7, Issue 4, pp. 44-52, 1993, Jul. 1993.
Jeffrey R. Michel; MSci Thesis, University of Virginia, 1993, Aug. 1993.
Mark David Hayter; PhD Thesis, University of Cambridge, 1993, Sep. 1993.
Jonathan Kay and Joseph Pasquale; ACM Computer Communication Review, vol. 23, No. 4, pp. 259-268, 1993, Oct. 1993.
W. E. Leland, et al.; ACM Computer Communication Review, vol. 23, No. 4, p. 85-95, 1993, Oct. 1993.
C. A. Thekkath, et al.; ACM Computer Communication Review, vol. 23, No. 4, 1993, Oct. 1993.
Raj K. Singh, et al.; Proceedings of the 1993 ACM/IEEE conference on Supercomputing, p. 452-461, Portland, Oregon, Nov. 15, 1993.
Peter Druschel and Larry L. Peterson; ACM Operating Systems Review, vol. 27, Issue 5, p. 189-202, 1993, Dec. 1993.
Matthias Kaiserswerth; IEEE/ACM Transactions on Networking, vol. 1, No. 6, p. 650-663, 1993, Dec. 1993.
Chris Maeda, Brian Bershad; ACM Operating Systems Review, vol. 27, Issue 5, p. 244-255, 1993, Dec. 1993.
Greg Regnier, et al.; IEEE Micro, vol. 24, No. 1, p. 24-31, 1994, Jan. 1994.
J. Vis; Acm Computer Communication Review, vol. 24, No. 1, pp. 7-11, 1994, Jan. 1994.
Danny Cohen, Gregory Finn, Robert Felderman, Annette DeSchon; Journal of High Speed Networks, Jan. 3, 1994.
Gregory G. Finn and Paul Mockapetris; Proceedings of InterOp '94, Las Vegas, Nevada, May 1994.
Stuart Wray, et al.; Proceedings of the International Conference on Multimedia Computing and Systems, p. 265-273, Boston, 1994, May 1994.
Various forum members; Message-Passing Interface Forum, University of Tennessee, Knoxville, 1994, May 5, 1994.
Raj K. Singh, et al.; ACM Computer Communication Review, vol. 24, No. 3, p. 8-17, 1994, Jul. 1994.
P. Druschel, et al.; ACM Computer Communication Review, vol. 24, No. 4, 1994, Oct. 1994.
Sally Floyd; ACM Computer Communication Review, vol. 24, No. 5, p. 8-23, 1994, Oct. 1994.
A. Edwards, et al.; ACM Computer Communication Review, vol. 24, No. 4, pp. 14-23, 1994, Oct. 1994.
L. S. Brakmo, et al.; ACM Computer Communication Review, vol. 24, No. 4, p. 24-35, 1994, Oct. 1994.
A. Romanow and S. Floyd; ACM Computer Communication Review, vol. 24, No. 4, p. 79-88, 1994, Oct. 1994.
R. J. Black, I. Leslie, and D. McAuley; ACM Computer Communication Review, vol. 24, No. 4, p. 158-167, 1994, Oct. 1994.
Babak Falsafi, et al.; Proceedings of the 1994 conference on Supercomputing, pp. 380-389, Washington D.C., Nov. 14, 1994.
Mengjou Lin, et al.; Proceedings of the 1994 conference on Supercomputing, Washington D.C., Nov. 14, 1994.
Nanette J. Boden, et al.; Draft of paper published in IEEE Micro, vol. 15, No. 1, pp. 29-36, 1995, Nov. 16, 1994.
Thomas Sterling, et al.; Proceedings of the 24th International Conference on Parallel Processing, pp. 11-14, Aug. 1995.
K. Kleinpaste, P. Steenkiste, B. Zill; ACM Computer Communication Review, vol. 25, No. 4, p. 87-98, 1995, Oct. 1995.
C. Partridge, J. Hughes, J. Stone; ACM Computer Communication Review, vol. 25, No. 4, p. 68-76, 1995, Oc. 1995.
A. Edwards, S. Muir; ACM Computer Communication Review, vol. 25, No. 4, 1995, Oct. 1995.
J. C. Mogul; ACM Computer Communication Review, vol. 25, No. 4, 1995, Oct. 1995.
Thorsten von Eicken, et al.; ACM Operating Systems Review, vol. 29, Issue 5, p. 109-126, 1995, Dec. 1995.
D. L. Tennenhouse, D. J. Wetherall; ACM Computer Communication Review, vol. 26, No. 2, pp. 15-20, 1996, Apr. 1996.
Paul Ronald Barham; PhD Thesis, University of Cambridge, 1996, Jul. 1996.
Chi-Chao Chang, et al.; Proceedings of the 1996 ACM/IEEE conference on Supercomputing, Pittsburgh, Nov. 17, 1996.
Joe Touch, et al.; "Atomic-2" slides, Gigabit Networking Workshop '97 Meeting, Kobe, Japan, Apr. 1997, 10pp.

(56) References Cited

OTHER PUBLICATIONS

Joe Touch, et al.; "Host-based Routing Using Peer DMA," Gigabit Networking Workshop '97 Meeting, Kobe, Japan, Apr. 1997, 2pp.

O. Angin, et al.; ACM Computer Communication Review, vol. 27, No. 3, pp. 100-117, 1997, Jul. 1997.

Charles P. Thacker and Lawrence C. Stewart; ACM Operating Systems Review, vol. 21, Issue 4, p. 164-172, 1987, Oct. 1997.

Ed Anderson, et al.; Proceedings of the 1997 ACM/IEEE conference on Supercomputing, p. 1-17, San Jose, California, Nov. 16, 1997.

Harvey J. Wassermann, et al.; Proceedings of the 1997 ACM/IEEE conference on Supercomputing, p. 1-11, San Jose, California, Nov. 16, 1997.

Philip Buonadonna, et al.; Proceedings of the 1998 ACM/IEEE conference on Supercomputing, p. 1-15, Orlando, Florida, Nov. 7, 1998.

Parry Husbands and James C. Hoe; Proceedings of the 1998 ACM/IEEE conference on Supercomputing, p. 1-15, Orlando, Florida, Nov. 7, 1998.

Michael S. Warren, et al.; Proceedings of the 1998 ACM/IEEE conference on Supercomputing, Orlando, Florida, Nov. 7, 1998.

John Salmon, et al.; Proceedings of the 1998 ACM/IEEE conference on Supercomputing, Orlando, Florida, Nov. 7, 1998.

Boon S. Ang, et al.; Proceedings of the 1998 ACM/IEEE conference on Supercomputing, Orlando, Florida, Nov. 7, 1998.

S. L. Pope, et al.; Parallel and Distributed Computing and Networks, Brisbane, Australia, 1998, Dec. 1998.

M. de Vivo, et al.; ACM Computer Communication Review, vol. 29, No. 1, pp. 81-85, 1999, Jan. 1999.

M. Allman; ACM Computer Communication Review, vol. 29, No. 3, 1999, Jul. 1999.

Steve Muir and Jonathan Smith; Technical Report MS-CIS-00-04, University of Pennsylvania, 2000, Jan. 2000.

Patrick Crowley, et al.; Proceedings of the 14th international conference on Supercomputing, pp. 54-65, Santa Fe, New Mexico, May 8, 2000.

Jonathan Stone, Craig Partridge; ACM Computer Communication Review, vol. 30, No. 4, pp. 309-319, 2000, Oct. 2000.

W. Feng and P. Tinnakornsrisuphap; Proceedings of the 2000 ACM/IEEE conference on Supercomputing, Dallas, Texas, Nov. 4, 2000.

Jenwei Hsieh, et al.; Proceedings of the 2000 ACM/IEEE conference on Supercomputing, Dallas, Texas, Nov. 4, 2000.

Ian Pratt and Keir Fraser; Proceedings of IEEE Infocom 2001, pp. 67-76, Apr. 22, 2001.

\* cited by examiner

DATA TRANSMISSION WITH CONSTANT DATA RATE

This is a national stage entry under 35 U.S.C. 371 of PCT/GB2004/000879 filed 3 Mar. 2004, which is based on Great Britain Patent Application No. GB0304807.1 filed 3 Mar. 2003.

BACKGROUND

1. Field of the Invention

This invention relates to managing data transmission and to network equipment capable of managing data transmission.

2. Related Art

When data is to be transferred between two devices over a data channel, each of the devices must have a suitable network interface to allow it to communicate across the channel. The devices and their network interfaces use a protocol to form the data that is transmitted over the channel, so that it can be decoded at the receiver. The data channel may be considered to be or to form part of a network, and additional devices may be connected to the network.

The Ethernet system is used for many networking applications. Gigabit Ethernet is a high-speed version of the Ethernet protocol, which is especially suitable for links that require a large amount of bandwidth, such as links between servers or between data processors in the same or different enclosures. Devices that are to communicate over the Ethernet system are equipped with network interfaces that are capable of supporting the physical and logical requirements of the Ethernet system. The physical hardware components of network interfaces are referred to as network interface cards (NICs), although they need not be in the form of cards: for instance they could be in the form of integrated circuits (ICs) and connectors fitted directly on to a motherboard.

Ethernet and some other network protocols use an XON/XOFF system to manage flow control. When a network is congested and wishes to exert backpressure so as to prevent a data transmitter from transmitting it transmits an XOFF message to the transmitter. When data transmission is to start again, it transmits an XON message to the transmitter. Other network protocols use properties such as rate control or credit allocation to achieve a similar function.

Data for transmission must be passed by a processor or other device to the NIC. Conventionally this is done over a bus using DMA (direct memory access) or load-store operations.

In general it is highly desirable to use load-store operations to implement a user-accessible interface from a computer to a network because of the low overhead and low latency by which an application is able to transfer data to the NIC using load-store. Even so, DMA is still used for large transfers because it allows the task of transferring the data to be off-loaded from the main processor. When PIO (programmed input/output) is in use it is imperative that as far as possible the NIC is always able to accept the PIO transfer, otherwise the cost of the feedback mechanism is likely to outweigh the benefits of the PIO access.

Generally data is transferred from the processor's cache, over the memory (front-side) bus, via an IO controller and the IO bus to the NIC. Typically the IO bus is the PCI (peripheral component interconnect) The (PCI) bus protocol often requires that once a target device has accepted a data transaction from a master, that some data must always be able to pass through, otherwise the bus protocol is violated. This requires that although the data rate across the bus may be slowed, it must not fall to zero over a certain time interval (e.g. 10 microseconds). Otherwise, the bus may crash, or at the very least, system performance for other devices will become badly degraded. Similarly a target device must respond to a new request within a certain time interval (e.g. 1 millisecond). As a result, if the network is in an XOFF state for a considerable amount of time, the NIC must stop the PIO stream of data from the processor using another means. That means is generally an interrupt. However, the use of interrupts raises problems. First, excessive use of interrupts would negate many of the benefits of the PIO protocol. Second, on a multi-processor machine it may take a considerable time for an interrupt to shut off the data stream from an arbitrary user-level application. This is because the application may be being handled by a different processor from the one that receives the interrupt. Third, since the bus protocol typically encourages bursty data, using interrupts to pass back flow control information can be an excessively harsh mechanism.

Note that DMA transfer does not suffer from these problems—if the network is congested the NIC simply does not request more data.

Another problem arises due to the difference in data format between a typical IO bus and a typical network protocol. Data transmitted to a NIC over an IO bus tends to be bursty because load-store operations are generally performed at the granularity of the number of the processor's registers at once, and because the boundary of the IO bus tends to be at the write buffer of the processor. The bursts tend to be around four to 16 words long, depending on the processor. By contrast Data received by a NIC by DMA tends to be in much bigger bursts, for example of up to 256 words. When the data is received at the NIC, it is generally formed into network packets, for example Ethernet packets. Network packets generally have a maximum size and a relatively large minimum size, which are specified by the network protocol. For instance, Ethernet packets have a minimum size of 64 bytes and a maximum size of typically 1500 bytes, although some Ethernet (and some other networks) can be configured to permit larger packet sizes.

The specification for the Ethernet physical layer stipulates that once sending of a packet has begun, the sending of the packet must be completed. This is usually enforced by the MAC layer of the NIC. Therefore, when it is receiving data for transmission in Ethernet packets the NIC must make a decision on how many bursts it should wait to receive before forming the received data into a packet for transmission. Waiting for relatively many bursts to arrive before forming a packet makes for high average latency on the network link, since there can be a considerable delay before data received at the NIC is formed into a packet. On the other hand, forming Ethernet packets from relatively few bursts introduces bandwidth overheads.

The NIC contains a packetisation engine, which forms packets from the data received for transmission. A number of strategies have previously been employed for determining how much data to wait to receive before forming a packet. Some systems (e.g. SCI) have employed heuristics, but even this can produce poor results in some situations. Also using heuristics imposes a considerable processing load on the NIC.

There is therefore a need for an improved mechanism of managing data transmission.

SUMMARY

According to one aspect of the present invention there is provided a method for forming data received from a data source into frames for transmission over a data link according to a protocol in which data is carried as data frames and in which once transmission of the data frame begun the entirety of the data frame must be transmitted at no less than a pre-set data rate, the method comprising: including in a frame traffic data formed from data received for transmission from the data source, and if insufficient data received for transmission from the data source is available to transmit the frame at the pre-set data rate, including in the frame padding data, the padding data being of a predetermined format distinguishable from the traffic data.

Preferably the data is formed into frames by a network interface device. Preferably the network interface device receives the data from the data source by a read-write protocol. The protocol may be a load-store protocol. In contrast, preferably a flow controlled data protocol is used over the data link.

The flow-controlled data protocol may be a programmed input/output (PIO) or a direct memory access (DMA) protocol.

The flow-controlled data is preferably be received over a local bus, for example from a local processor or memory.

The method may comprise: negotiating the determined data rate with a receiver; and transmitting the frames over the data link to the receiver at no less than the determined data rate. The method may comprise, on receiving traffic data from the data source at less than the predetermined data rate, transmitting padding data together with the traffic data so as to transmit data at no less than the determined data rate.

The method may comprise determining whether the frame can currently be transmitted over the data link, and if the frame cannot be transmitted over the data link, removing at least some of the padding data from the frame; and subsequently retrying to send frame over the data link.

The padding data may consist of one or more data units (e.g. data words) of a predefined format and/or of invalid data. The padding data may be identified by data (e.g. one ore more data units) at its start that is of a predefined format and data at its end that is of a predefined format. Those formats may be the same or different. The or each format preferably includes part of the content of the respective data/data unit(s).

The method preferably comprises receiving the data frames over the data link, removing the padding data therefrom and processing the remaining received data.

According to a second aspect of the present invention there is provided a method for forwarding data from a first data link data to a second data link, the data being carried over each data link as data frames, the method comprising: receiving over the first data link data a first data frame containing traffic data and padding data, the padding data being of a predetermined format distinguishable from the traffic data; distinguishing the traffic data contained in the first frame from the padding data contained in the first frame; forming one or more second frames for transmission over the second data link, the second frames together comprising all the traffic data contained in the first frame and less than all of the padding data contained in the first frame; and transmitting the or each second frame over the second data link.

Preferably the data is formed into frames by a network forwarding device. The network forwarding device may be a router or a switch.

The method preferably comprises determining whether the first frame can currently be transmitted over the second data link, and wherein the second frame(s) are formed containing less than all of the padding data contained in the first frame only if the first frame cannot currently be transmitted over the second data link.

The method preferably comprises, if the first frame can currently be transmitted over the second data link forming one or more second frames for transmission over the second data link, the second frames together comprising all the traffic data contained in the first frame and all of the padding data contained in the first frame.

Preferably the step of forming the second frame(s) is begun before the whole of the first data frame has been received over the data link.

Preferably the step of transmitting the second frame(s) is begun before the whole of the first data frame has been received over the data link.

The present invention will now be described by way of example.

DETAILED DESCRIPTION

Figure 1:
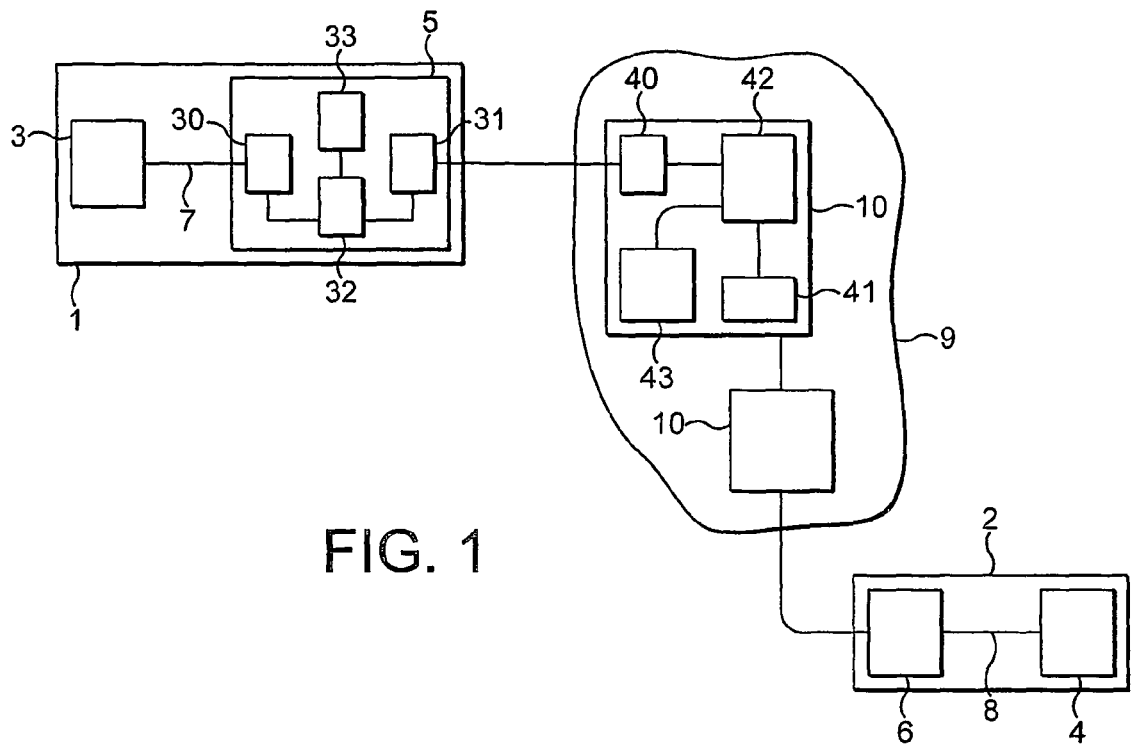
FIG. 1 is a schematic diagram of a network data transmission system.

In the present system, a NIC receives data over a local bus or other data link and transmits it over a network. To reduce latency over the network the NIC can begin transmitting a packet before it has received over the local bus all the data that is to form the packet. If insufficient data arrives over the local bus to fill the packet at the rate at which it is being transmitted then the NIC continues transmitting the packet but including padding data generated by the NIC itself. This allows latency on the network link to be kept low without generating excessive numbers of packets. As will be described below, other network entities on at the path to the ultimate receiver of the packets may strip out the padding data to achieve further increases in efficiency. FIG. 1 is a schematic diagram of a data transmission system. In the system of FIG. 1 data is transferred from a first network entity 1 to a second network entity 2. The network entities 1, 2 could be personal computers or other network-capable devices. Each network of the entities 1, 2 includes a processor 3, 4 and a NIC 5, 6. Each processor is connected to its respective NIC via a local PIO bus 7, 8. The NICs are connected through a network 9. The network includes other network entities 10, typically routing such as switches or routers.

In the description below, the transmission of data from entity 1 to entity 2 will be discussed. The entities are preferably also capable of transmitting data in the opposite direction too. Each NIC 5, 6 is preferably capable of transmitting and receiving data to and from the network 9.

Data is sent from processor 3 to NIC 5 as a PIO or DMA stream. In simple terms, a PIO stream arrives as a block of data containing an address followed by a number of data words. Typically these blocks of data at arrive at the NIC spaced apart by short gaps which arise due to bus arbitration, data-not-ready delays, the limited numbers of processor registers and relatively small write merge units. The NIC accepts the blocks of data and packs them a into an Ethernet packet for transmission to entity 2 over network 9. One approach for the formatting of such a packet is described in our co-pending patterned application entitled "Network Interface and Protocol".

Figure 2:
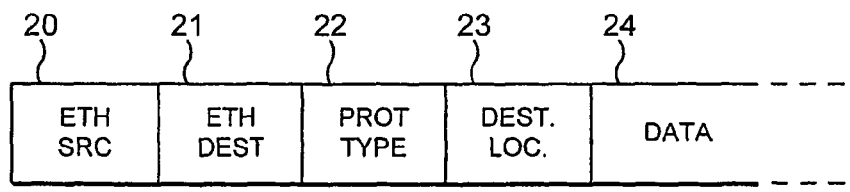
FIG. 2 is a diagram showing the structure of an Ethernet packet.

FIG. 2 shows a generalised form of the Ethernet packet that is generated. The packet includes a source address 20, a destination address 21, a protocol type identified at 22, a destination location field 23 (which indicates, or can be used to determine, the memory location at the receiver 2 to which the data is to be applied), and the data itself 24. The data 24 is formed by the NIC from the data blocks received from the processor 3. As indicated above, having begun transmitting a packet the NIC 5 adds traffic data to the packet as it is received from the processor 3. Once transmission of the packet has begun, in order to satisfy the network protocol the NIC must continue to transmit the packet at the network's set data rate or it must terminate the packet. If data is needed in order to meet the required transmit rate and all the data so far received from the processor for transmission has already been formed into one or more packets then the NIC adds padding data to the packet.

The padding data is formed by adding bytes that are invalid according to the coding scheme used in the packet, or in another way that allows the padding data to be identified and discarded at a later stage. Other schemes for identifying padding data could be used, depending on the network protocol that was being used. The exact scheme to be used in a particular implementation must be selected based on other protocol conventions to be used in the system. One preferred option is to define a specific form of data unit (e.g. a byte or word) that indicates padding data. This may operate in any one or more of a number of ways.

1. A data unit having the predetermined form may constitute the padding data itself. Such a data unit may be repeated as necessary to form padding data of an arbitrary length. This enables padding data that is only the length of a single such data unit to be signalled. This can permit fine control over the effective (traffic) data rate.
2. A data unit having the predetermined form may flag that one or another specified number of subsequent data units are padding data. Those subsequent data units may then be transmitted as all-zeros, or some other convenient form.
3. A data unit having the predetermined form may be present at the start and the end of a block of padding data. Alternatively, there may be different predetermined forms to mark the start and end.

In each case the protocol is known to the transmitter and the receiver, so the receiver can delete the padding data. Another method is for a data unit of a predetermined form (that is known to the receiver, as above) to be defined by the protocol such that if can flag padding data by dividing each packet into fixed-size data blocks and implementing a separate checksum for each block, which can be set to an incorrect value to invalidate the data in that block. A common predetermined form of data unit may serve all these purposes by including flag bits that can indicate each instance. The predetermined form of data unit may be an escape word. The predetermined form of data preferably can include a flag that indicates that a subsequent data unit is to be treated as being valid traffic data, so that traffic data that has the same form as the escape word can be transmitted.

A DMA stream is transmitted in exactly the same manner, the only differences being that the data block size is larger than PIO and that the NIC must request the data from the CPU's memory system. Further details of this scheme are set out in our co-pending patent application entitled "Data Protocol".

Figure 3:
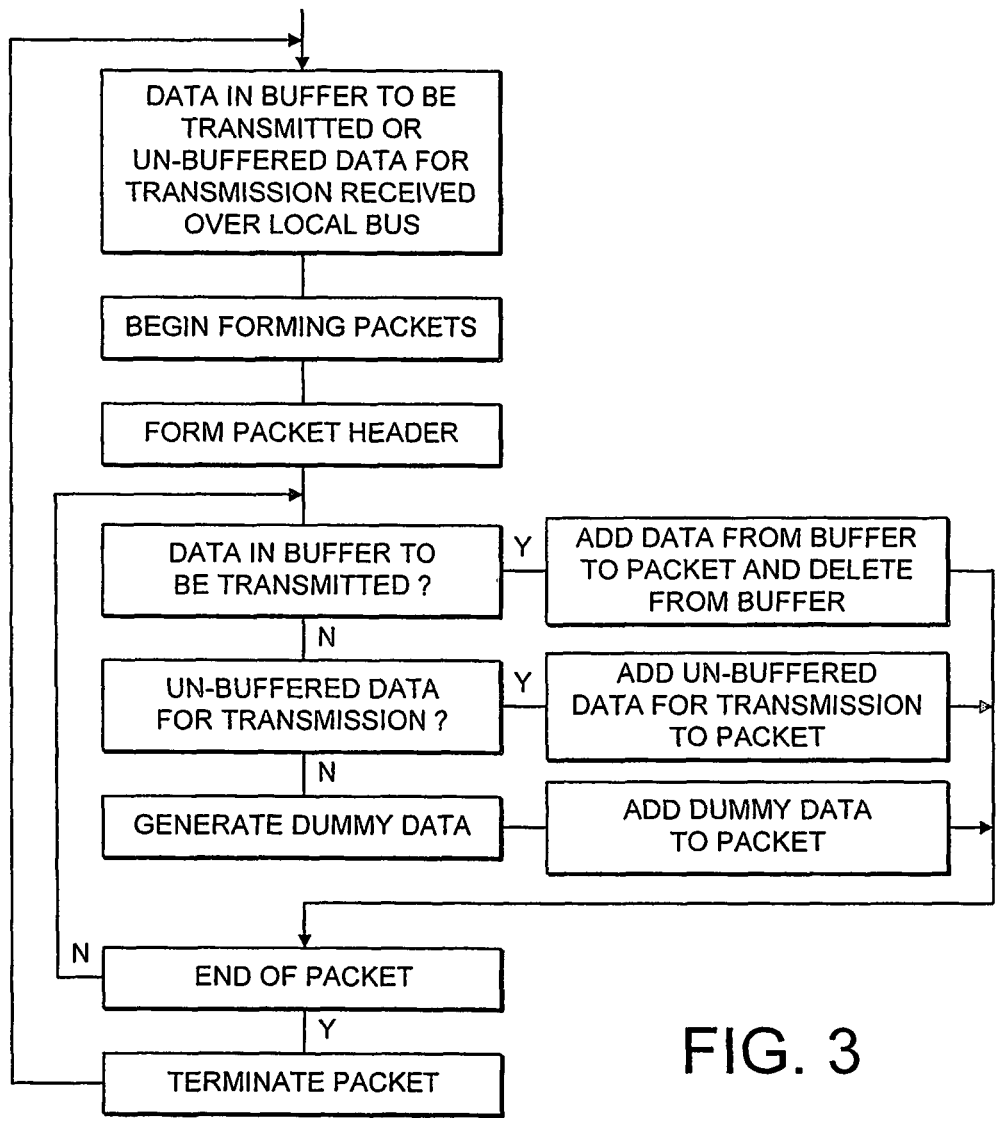
FIG. 3 illustrates a decision process for operation of a transmitting NIC.

FIG. 3 shows the process used by the NIC to form packets.

The packet is passed over the network 9 to the entity whose address is specified in the destination address field 21. In this example that is the entity 2. On receiving the packet the entity 2 processes the data encoded in the packet. In doing so it discards any invalid data in the packet, which includes the padding data, and recovers the remainder of the data, which represents the packet's traffic data. As a result the data received by the NIC 5 from processor 3 can be recreated at NIC 6. NIC 6 passes the received data to processor 4 for further processing.

This method has a number of advantages. First, when the NIC first receives data that is to be transmitted over the network there is no need for it to wait until additional data sufficient to fill an Ethernet packet has arrived before it begins to send that data over the network. Instead, it can begin forming and transmitting the network packet immediately. This reduces latency. Second, the processing capabilities of the NIC can be simpler than the prior NICs that have employed heuristic algorithms to determine the number of bus data blocks to be included in a packet. This reduces cost.

The present method involves the transmission of additional data (the padding data) compared to prior methods. However, since bus traffic is typically very bursty, the disadvantage of increased bandwidth is likely to be outweighed in many circumstances by the reduction in latency. Also PIO is as well as bursty, generally used for small data transfers where the additional bandwidth overhead is not a burden. DMA is used for larger transfers, resulting in much larger bursts, far less padding data and hence little overhead. In addition, the padding data can be filtered out of the transmitted packets in the course of their passage to the ultimate receiver, as described in more detail below.

The NIC must still be able to determine when to terminate a packet. One suitable approach is for it to simply terminate the packet and start another when the packet reaches a predetermined length. That length could be the maximum permitted in the network protocol that is being used, or a shorter length.

In normal Ethernet operation a packet must be completely received at a network entity before that entity can forward the packet to the next hop on its path to the destination specified in the packet. In a method known as cut-through forwarding a network entity can begin to forward the packet before it has completely received it. When the present system is being employed it is highly advantageous if all the network entities 10 on the path between the transmitting entity 1 and the receiving entity 2 employ cut-through forwarding, as then the advantages of reduced latency that the present system provides can be passed all the way to the receiving entity.

When there is network congestion between a network entity that is to transmit the packet (e.g. entity 2 or any of the entities 10) and the entity to which it is to transmit the packet, the entity that is to transmit the packet may have to buffer all or part of the packet before it can be transmitted. In an Ethernet system this may happen if the network entity has received an XOFF signal from the next entity on the packet's route. It is preferred that the network entity can modify packets that it is buffering so as to delete some or all padding data from them. In that way less bandwidth will be used to transmit the packet on subsequent hops. This process may be employed whether or not the network entity supports cut-through forwarding. Referring to FIG. 1, this process may be employed in one or more of the routing devices 10 and in the NIC 1, if it has the capacity to buffer packets after having formed them itself.

The mechanism of introducing padding data into packets, as described above, can also be used by a transmitting network entity (e.g. NIC 1 or routing device 10) in order to manipulate the flow control signals it receives from the network. The network entity can detect that the network is congested, for example by detecting an increase in the proportion of time for which it is prevented from transmitting data by the imposition of an XOFF state from the network. It may also detect this from messages sent by the network reporting on available bandwidth, and from those it could learn of congestion beyond the net hop. Further specific mechanisms for determining if congestion is occurring is as follows:

(a) Following an XOFF to XON transition, the network can be assumed to be congested. The NIC would then want to adjust data rate to maximise the time to next XOFF event, while also maximising the available data rate.

(b) A network device 10, e.g. a switch to which the NIC is connected may generate special signalling packets, as described above. These signalling packets may indicate data rate (e.g. from ATM rate based flow control). One suitable mechanism for IP-based networks is ECN (Explicit Congestion Notification), see RFC 3168.

(c) For a network which uses credit based flow control, either the less frequent receipt of credits, or that the credits received are smaller than usual would indicate congestion.

On detecting congestion the NIC can respond by introducing additional padding data into the transmitted packet(s) whilst at the same time throttling the local bus 7, for example by means of disconnect or RETRY signals. This is likely to have the effect of reducing the frequency of XOFF signals sent from the network to the NIC, thus reducing the amount of data stalled at the NIC and reducing the frequency of interrupts required to stall the stream of data over the bus.

The bus is most preferably throttled such that the "retry time" is equal to the padding data period. In order to achieve 50% data throttle, insert one padding data for each valid data. 25% reduction means insert one padding word for every two valid words.

This algorithm results in a smooth reduction of the effective data rate as congestion increases, instead of a sudden cut-off as would be caused in an XOFF signal or equivalent were received by the transmitter.

The following table indicates possible behaviour of the NIC when the next hop from the NIC (e.g. an Ethernet switch to which it is directly connected) is not capable of stripping padding data from packets it is passing.

| NIC transmission state | Packet formation | Local bus control |
| --- | --- | --- |
| XOFFed | Pack data received over local bus into a buffer in the NIC. | Rate limit (e.g. using disconnect or RETRY) until buffer is full, then issue interrupt to prevent any more data from being received. |
| XON | Transmit any buffered data, or if no buffered data any data received over the local bus. If no buffered data and no data received over local bus whilst in a packet, transmit padding data. | Accept data at full rate. |
| XON but network congestion detected | Optionally stall packet for enough time to strip out gaps in data received over the local bus in a pipelined manner, and thereby have the transmitted packet contain less padding data. | Rate limit (e.g. using disconnect or RETRY). Occasional interrupts may be sent to reduce the data rate so that the buffer fills at an acceptable rate. |

The following table indicates possible behaviour of the NIC when the next hop from the NIC is capable of stripping padding data from packets it is passing.

| NIC transmission state | Packet formation | Local bus control |
| --- | --- | --- |
| XOFFed | Pack data received over local bus into a buffer in the NIC. | Rate limit (e.g. using disconnect or RETRY) until buffer is full, then issue interrupt to prevent any more data from being received. |
| XON | Transmit any buffered data, or if no buffered data any data received over the local bus. If no buffered data and no data received over local bus whilst in a packet, transmit padding data. | Accept data at full rate. |
| XON but network congestion detected | Introduce additional padding data into packets for transmission. Gaps stripped out by switch. Or any entity including destination NIC, where the data is buffered | Rate limit (e.g. using disconnect or RETRY). Occasional interrupts may be sent to reduce the data rate so that the buffer fills at an acceptable rate. |

When the entity that is on the next hop from the NIC is capable of stripping padding data from packets it is passing, the network link from the NIC to that next hop entity can preferably be run at full data rate for much of the time, as throttling of the data rate on the subsequent hop can be achieved by the next hop entity stripping padding data from the packets sent from the NIC. However, when there is congestion the effective data rate is reduced due to the insertion by the NIC of additional padding data. Hence the XOFF state is minimised as are the number of interrupts required to maintain an efficient flow of data.

In FIG. 2 the components of NIC 5 and one of the routing devices 10 are shown in more detail.

NIC 5 comprises a local bus interface 30, a network interface 31, a packetisation engine 32 and a buffer 33. The local bus interface handles communications with the bus 7. The local bus interface can be controlled by the packetisation engine in order to have it issue disconnect or RETRY signals or interrupts, as described above. The network interface 31 provides an interface network 9. The packetisation engine operates as described above to form data received from the local bus interface into packets, to control the local bus interface and to store in buffer 33 packets that are not to be immediately transmitted. The packetisation engine can pass data to be transmitted over the network to the network interface 31 for onward transmission. The data passed to the network interface could be data received directly from the local bus interface 33 (if it is to be transmitted immediately), data retrieved from the buffer 33 (if it has been buffered awaiting transmission) or data generated in the packetisation engine (in the case of padding data). The packetisation engine also determines when to terminate a packet (e.g. if it has reached a pre-set length).

The routing device 10 comprises a first network interface 40, a second network interface 41, a switching processor (and or hardware switch fabric) 42 and a buffer 43. The buffer 43 could be attached directly to the network interfaces 40, 41. The network interfaces 40, 41 interface to the network entities that are directly connected to the routing device 10. In practice, a routing device would generally have a large number of network interfaces. The switching processor 42 routes data between the network interfaces, and can store data in buffer 43 if the network interface from which the data is to be transmitted cannot immediately transmit the data. The switching processor stores the characteristics of the padding data and identifies and removes padding data from any data being passed to and/or retrieved from the buffer 43. In practice, the routing device may have numerous network interfaces and the switching processor 42 may handle switching of traffic between them.

The packetisation engine and the switching processor are each preferably pre-programmed to be able to support the present method.

Each network entity is preferably capable of informing each network entity to which it is directly connected of whether it is capable of detecting and removing padding data from packets and/or whether it is capable of performing cut-through forwarding. For backward compatibility it is preferably assumed that an entity is not capable of detecting and removing padding data or performing cut-through forwarding unless it indicates that it can do so. Preferably each network entity indicates its capability for detecting and removing padding data on being connected to another entity. Alternatively, a NIC that is to transmit data could probe the route between itself and a destination to determine whether padding data will be deleted along the route. To do this it performs a test routine by informing the NIC at the destination that test packets including padding data are to be transmitted. On receiving the test packets the NIC at the destination reports to the transmitting NIC (or protocol software) on whether the packets were received with the padding data still in them. It could also report on latency and other network performance measures.

The local bus could operate as a PIO bus, or as a DMA bus, or in another way. The network could operate according to an Ethernet protocol (for instance gigabit Ethernet) or according to another protocol. The data transmitted over the network could be in packets or another type of data frame. The minimum data rate at which data is to be transmitted between the transmitter and the receiver could be negotiated between the transmitter and the receiver. Alternatively, it could be fixed in the network.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for forming data received from a data source into frames, the method comprising:
    forming a frame for transmission over a data link according to a protocol in which data is carried as variable length data frames that can differ in bit length and in which once transmission of the data frame begun the entirety of the data frame must be transmitted, and in which the data is to be transmitted at no less than a determined data rate by: (a) including in the frame traffic data formed from data received for transmission from the data source; (b) determining that insufficient data received for transmission from the data source is available to transmit the frame at the determined data rate; and (c) responsive to that determination including in the frame padding data, the padding data being of a predetermined format distinguishable from the traffic data.

2. A method as claimed in claim 1, wherein the data is formed into frames by a network interface device.

3. A method as claimed in claim 1, comprising the network interface device receiving the data from the data source by a read/write data protocol.

4. A method as claimed in claim 3, wherein the flow-controlled data protocol is a programmed input/output (PIO) or a direct memory access (DMA) protocol.

5. A method as claimed in claim 4, wherein the flow-controlled data is received over a local bus.

6. A method as claimed in claim 1, comprising:
    negotiating the determined data rate with a receiver; and
    transmitting the frames over the data link to the receiver at no less than the determined data rate.

7. A method as claimed in claim 6, wherein the method comprises, on receiving traffic data from the data source at less than the predetermined data rate, transmitting padding data together with the traffic data so as to transmit data at no less than the determined data rate.

8. A method as claimed in claim 1, comprising determining whether the frame can currently be transmitted over the data link, and if the frame cannot be transmitted over the data link, removing at least some of the padding data from the frame; and subsequently retrying to send frame over the data link.

9. A method as claimed in claim 1, wherein the padding data consists of one or more data units of predefined format.

10. A method as claimed in claim 1, wherein the padding data consists of invalid data.

11. A method as claimed in claim 1, wherein the padding data is identified by data at its start that is of a predefined format and data at its end that is of a predefined format.

12. A method as claimed in claim 1, comprising receiving the data frames over the data link, removing the padding data therefrom and processing the remaining received data.

13. A network interface device arranged to perform the method of claim 1.

14. A method for forwarding data received from a first data link, onto a second data link, the data being received from the first data link according to a protocol in which data is carried as variable length data frames that can differ in bit length, the data being transmitted onto the second data link according to a protocol in which data is carried as variable length data frames that can differ in bit length, the method comprising:
    receiving over the first data link a first data frame containing traffic data and padding data, the padding data being of a predetermined format distinguishable from the traffic data;
    distinguishing the traffic data contained in the first frame from the padding data contained in the first frame;
    determining whether the first frame can currently be transmitted over the second data link; and,
    if the first frame cannot currently be transmitted over the second data link performing the steps of:
    forming one or more second frames for transmission over the second data link, the second frames together comprising all the traffic data contained in the first frame and less than all of the padding data contained in the first frame; and
    transmitting the or each second frame over the second data link.

15. A method as claimed in claim 14, wherein the data is formed into frames by a network forwarding device.

16. A method as claimed in claim 15, wherein the network forwarding device is a router or a switch.

17. A method as claimed in claim 14, comprising if the first frame can currently be transmitted over the second data link forming one or more second frames for transmission over the second data link, the second frames together comprising all the traffic data contained in the first frame and all of the padding data contained in the first frame.

18. A method as claimed in claim 14, wherein the step of forming the second frame(s) is begun before the whole of the first data frame has been received over the data link.

19. A method as claimed in claim 14, wherein the step of transmitting the second frame(s) is begun before the whole of the first data frame has been received over the data link.

20. A method as claimed in claim 14, wherein the padding data consists of data words of predefined content.

21. A method as claimed in claim 14, wherein the padding data consists of invalid data.

22. A method as claimed in claim 14, wherein the padding data is identified by preceding data of a predetermined format and an indication of the length of the stream of padding data following that preceding data.

23. A network forwarding device arranged to perform the method of claim 14.

24. A method for forming data received from a data source into frames, the method comprising:

forming a frame for transmission over a data link according to a protocol in which data is carried as variable length data frames that can differ in bit length and in which once transmission of the data frame begun the entirety of the data frame must be transmitted, and in which the data is to be transmitted at no less than a determined data rate by: (a) including in the frame traffic data formed from data received for transmission from the data source; (b) determining that insufficient data received for transmission from the data source is available to transmit the frame at the determined data rate; and (c) responsive to that determination including in the frame padding data, the padding data being of a predetermined format distinguishable from the traffic data; and determining whether the frame can currently be transmitted over the data link, and if the frame cannot be transmitted over the data link, removing at least some of the padding data from the frame; and subsequently retrying to send frame over the data link.

* * * * *